United States Patent
Gao et al.

(10) Patent No.: US 12,476,326 B2
(45) Date of Patent: Nov. 18, 2025

(54) INORGANIC MATERIALS FOR USE IN A LITHIUM-ION SECONDARY BATTERY

(71) Applicant: Pacific Industrial Development Corporation, Ann Arbor, MI (US)

(72) Inventors: Shuang Gao, Ann Arbor, MI (US); David Shepard, South Lyon, MI (US); Yunkui Li, Ann Arbor, MI (US); Anatoly Bortun, Ypsilanti, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 789 days.

(21) Appl. No.: 17/278,685

(22) PCT Filed: Oct. 30, 2020

(86) PCT No.: PCT/US2020/058093
§ 371 (c)(1),
(2) Date: Mar. 23, 2021

(87) PCT Pub. No.: WO2021/087190
PCT Pub. Date: May 6, 2021

(65) Prior Publication Data
US 2021/0273293 A1    Sep. 2, 2021

Related U.S. Application Data

(60) Provisional application No. 62/928,523, filed on Oct. 31, 2019, provisional application No. 62/928,511, (Continued)

(51) Int. Cl.
*H01M 50/431* (2021.01)
*H01M 4/02* (2006.01)
(Continued)

(52) U.S. Cl.
CPC ........... *H01M 50/431* (2021.01); *H01M 4/62* (2013.01); *H01M 4/628* (2013.01);
(Continued)

(58) Field of Classification Search
None
See application file for complete search history.

(56) References Cited

U.S. PATENT DOCUMENTS 5,728,489 A * 3/1998 Gao .................. H01M 10/0565
429/309
6,306,545 B1    10/2001 Carlson et al.
(Continued)

FOREIGN PATENT DOCUMENTS

CN    103508463 A    1/2014
EP    3009399 A1    4/2016
(Continued)

OTHER PUBLICATIONS

Xu et al., Multifunctional Lithium-Ion-Exchanged Zeolite-Coated Separator for Lithium Ion Batteries, Applied Energy Materials, Nov. 2018, 1, pp. 7237-7243 (Year: 2018).*
(Continued)

*Primary Examiner* — Brian R Ohara
*Assistant Examiner* — M. T. Leonard
(74) *Attorney, Agent, or Firm* — Dickinson Wright PLLC

(57) ABSTRACT

A cell for use in an electrochemical cell, such as a lithium-ion secondary battery that includes a positive electrode with an active material that acts as a cathode and a current collector; a negative electrode with an active material that acts as an anode and a current collector; a non-aqueous electrolyte; and a separator placed between the positive and negative electrodes. At least one of the cathode, the anode, the electrolyte, and the separator includes an inorganic additive in the form of one or more zeolites having a Si:Al
(Continued)

ratio ranging from 2-50 that absorbs one or more of moisture, free transition metal ions, or hydrogen fluoride that become present in the cell. One or more of the cells may be combined in a housing to form a lithium-ion secondary battery. The inorganic additive may also be incorporated as a coating applied to the internal wall of the housing.

12 Claims, 7 Drawing Sheets

Related U.S. Application Data filed on Oct. 31, 2019, provisional application No. 62/928,518, filed on Oct. 31, 2019.

(51) Int. Cl.

| | | |
|---|---|---|
| *H01M 4/131* | (2010.01) | |
| *H01M 4/134* | (2010.01) | |
| *H01M 4/136* | (2010.01) | |
| *H01M 4/38* | (2006.01) | |
| *H01M 4/485* | (2010.01) | |
| *H01M 4/525* | (2010.01) | |
| *H01M 4/587* | (2010.01) | |
| *H01M 4/62* | (2006.01) | |
| *H01M 10/0525* | (2010.01) | |
| *H01M 10/0567* | (2010.01) | |
| *H01M 50/117* | (2021.01) | |
| *H01M 50/124* | (2021.01) | |
| *H01M 50/414* | (2021.01) | |
| *H01M 50/446* | (2021.01) | |
| *H01M 50/449* | (2021.01) | |
| *H01M 50/451* | (2021.01) | |

(52) U.S. Cl.
CPC ... *H01M 10/0525* (2013.01); *H01M 10/0567* (2013.01); *H01M 50/117* (2021.01); *H01M 50/1243* (2021.01); *H01M 50/414* (2021.01); *H01M 50/446* (2021.01); *H01M 50/449* (2021.01); *H01M 50/451* (2021.01); *H01M 2004/021* (2013.01); *H01M 2004/027* (2013.01); *H01M 2004/028* (2013.01); *H01M 4/131* (2013.01); *H01M 4/134* (2013.01); *H01M 4/136* (2013.01); *H01M 4/382* (2013.01); *H01M 4/386* (2013.01); *H01M 4/485* (2013.01); *H01M 4/525* (2013.01); *H01M 4/587* (2013.01); *H01M 2300/0091* (2013.01)

(56) References Cited

U.S. PATENT DOCUMENTS

| | | |
|---|---|---|
| 10,950,836 B2 | 3/2021 | Xiao et al. |
| 2002/0061439 A1 | 5/2002 | Nemoto |
| 2016/0141609 A1* | 5/2016 | Mikuni .................. H01M 4/62 252/508 |
| 2016/0254511 A1 | 9/2016 | Hatta et al. |
| 2017/0005302 A1 | 1/2017 | Muroi |
| 2018/0254531 A1 | 9/2018 | Xiao et al. |
| 2018/0287134 A1 | 10/2018 | Ledwoch et al. |
| 2019/0067744 A1 | 2/2019 | Xiao et al. |
| 2019/0067748 A1* | 2/2019 | Saeki .................. H01M 4/13 |
| 2019/0252721 A1* | 8/2019 | Nozue .................. H01M 4/131 |

FOREIGN PATENT DOCUMENTS

| | | |
|---|---|---|
| EP | 3096387 A1 | 11/2016 |
| JP | 2015118877 A | 6/2015 |

OTHER PUBLICATIONS

Li et al. [Coordinatively unsaturated sites in zeolite matrix: Construction and catalysis, Chines Journal of Catalysis 40 (2019) 1255-1281] (Year: 2019).*

Zhang et al. [Polymers/zeolite nanocomposite membranes with enhanced thermal and electrochemical performances for lithium-ion batteries, Journal of Membrane Science 563 (2018) pp. 753-776 (Year: 2018).*

European Patent Office, Rijswijk, Netherlands, International Search Report of International Application No. PCT/US2020/058093, Mailed Feb. 17, 2021, 3 pages.

* cited by examiner

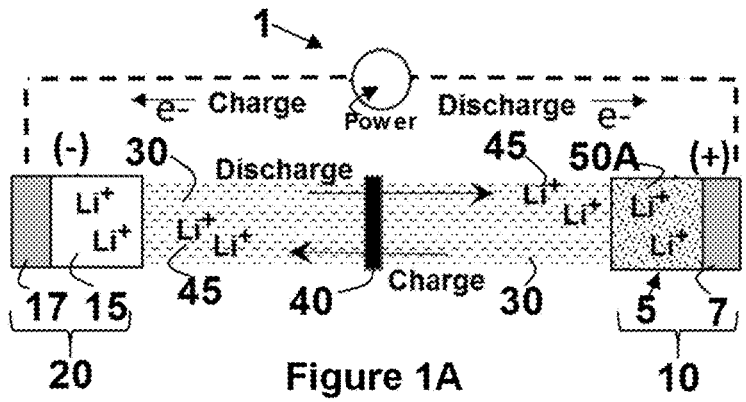
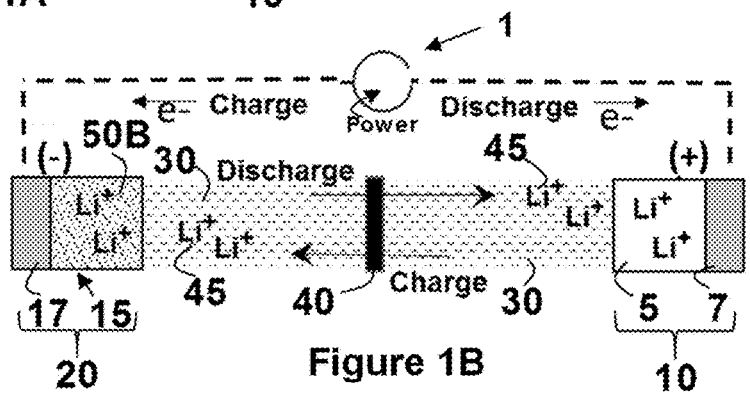
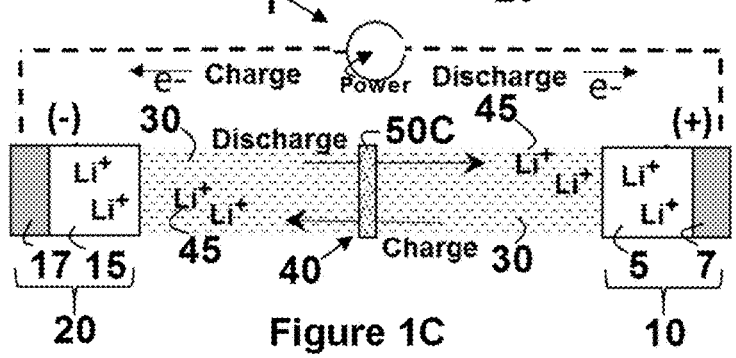
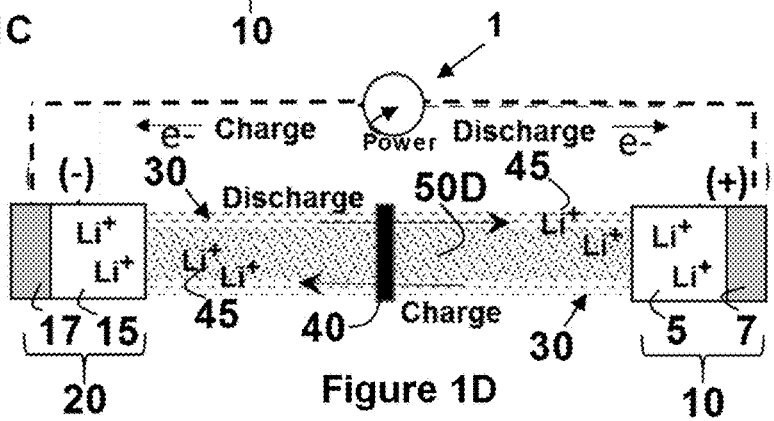

INORGANIC MATERIALS FOR USE IN A LITHIUM-ION SECONDARY BATTERY

CROSS REFERENCE TO RELATED APPLICATIONS

This application is a national stage filing of International Application No. PCT/US2020/058093 filed on Oct. 30, 2020, designating the United States and published in English, which claims the benefit of the filing date under 35 U.S.C. § 119 (e) of U.S. Provisional Application No. 62/928,511 filed on Oct. 31, 2019, U.S. Provisional Application No. 62/928,518 filed on Oct. 31, 2019, and U.S. Provisional Application No. 62/928,523 filed on Oct. 31, 2019, the entire contents of which are incorporated herein by reference in their entirety.

FIELD

This invention generally relates to inorganic materials, e.g., trapping agents or additives for use in an electrochemical cell, such as a lithium-ion secondary battery. More specifically, this disclosure relates to the use of zeolites as inorganic trapping agents or additives located in one or more electrodes (positive or negative), in the separator, or in the electrolyte of a cell used in a lithium-ion secondary battery.

BACKGROUND

The statements in this section merely provide background information related to the present disclosure and may not constitute prior art.

The main difference between a lithium-ion battery and a lithium-ion secondary battery is that the lithium-ion battery represents a battery that includes a primary cell and a lithium-ion secondary battery represents a battery that includes secondary cell. The term "primary cell" refers to a battery cell that is not easily or safely rechargeable, while the term "secondary cell" refers to a battery cell that may be recharged. As used herein a "cell" refers to the basic electrochemical unit of a battery that contains the electrodes, separator, and electrolyte. In comparison, a "battery" refers to a collection of cell(s), e.g., one or more cells, and includes a housing, electrical connections, and possibly electronics for control and protection.

Since lithium-ion (e.g., primary cell) batteries are not rechargeable, their current shelf life is about three years, after that, they are worthless. Even with such a limited lifetime, lithium batteries can offer more in the way of capacity than lithium-ion secondary batteries. Lithium batteries use lithium metal as the anode of the battery unlike lithium ion batteries that can use a number of other materials to form the anode.

One key advantage of lithium-ion secondary cell batteries is that they are rechargeable several times before becoming ineffective. The ability of a lithium-ion secondary battery to undergo the charge-discharge cycle multiple times arises from the reversibility of the redox reactions that take place. Lithium-ion secondary batteries, because of the high energy density, are widely applied as the energy sources in many portable electronic devices (e.g., cell phones, laptop computers, etc.), power tools, electric vehicles, and grid energy storage.

In operation, a lithium-ion secondary battery generally comprises one or more cells, which includes a negative electrode, a non-aqueous electrolyte, a separator, a positive electrode, and a current collector for each of the electrodes. All of these components are sealed in a case, an enclosure, a pouch, a bag, a cylindrical shell, or the like (generally called the battery's "housing"). Separators usually are polyolefin membranes with micro-meter-size pores, which prevent physical contact between positive and negative electrodes, while allowing for the transport of lithium-ions back and forth between the electrodes. A non-aqueous electrolyte, which is a solution of lithium salt, is placed between each electrode and the separator.

During operation, it is desirable that the Coulombic or current efficiency and the discharge capacity exhibited by the battery remains relatively constant. The Coulombic efficiency describes the charge efficiency by which electrons are transferred within the battery. The discharge capacity represents the amount of charge that may be extracted from a battery. Lithium-ion secondary batteries may experience a degradation in capacity and/or efficiency due to prolonged exposure to moisture (e.g., water), hydrogen fluoride (HF), and dissolved transition-metal ions ($TM^{n+}$). In fact, the lifetime of a lithium-ion secondary battery can become severely limited once 20% or more of the original reversible capacity is lost or becomes irreversible. The ability to prolong the rechargeable capacity and overall lifetime of lithium-ion secondary batteries can decrease the cost of replacement and reduce the environmental risks for disposal and recycling.

DESCRIPTION OF THE DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

FIG. 1A is a schematic representation of a lithium-ion secondary cell formed according to the teachings of the present disclosure in which an inorganic additive forms a portion of the positive electrode.

FIG. 1B is a schematic representation of another lithium-ion secondary cell formed according to the teachings of the present disclosure in which an inorganic additive forms a portion of the negative electrode.

FIG. 1C is a schematic representation of yet another lithium-ion secondary cell formed according to the teachings of the present disclosure in which an inorganic additive forms a coating on the separator.

FIG. 1D is a still another schematic representation of a lithium-ion secondary cell formed according to the teachings of the present disclosure in which an inorganic additive is dispersed within the electrolyte.

Figure 2A:
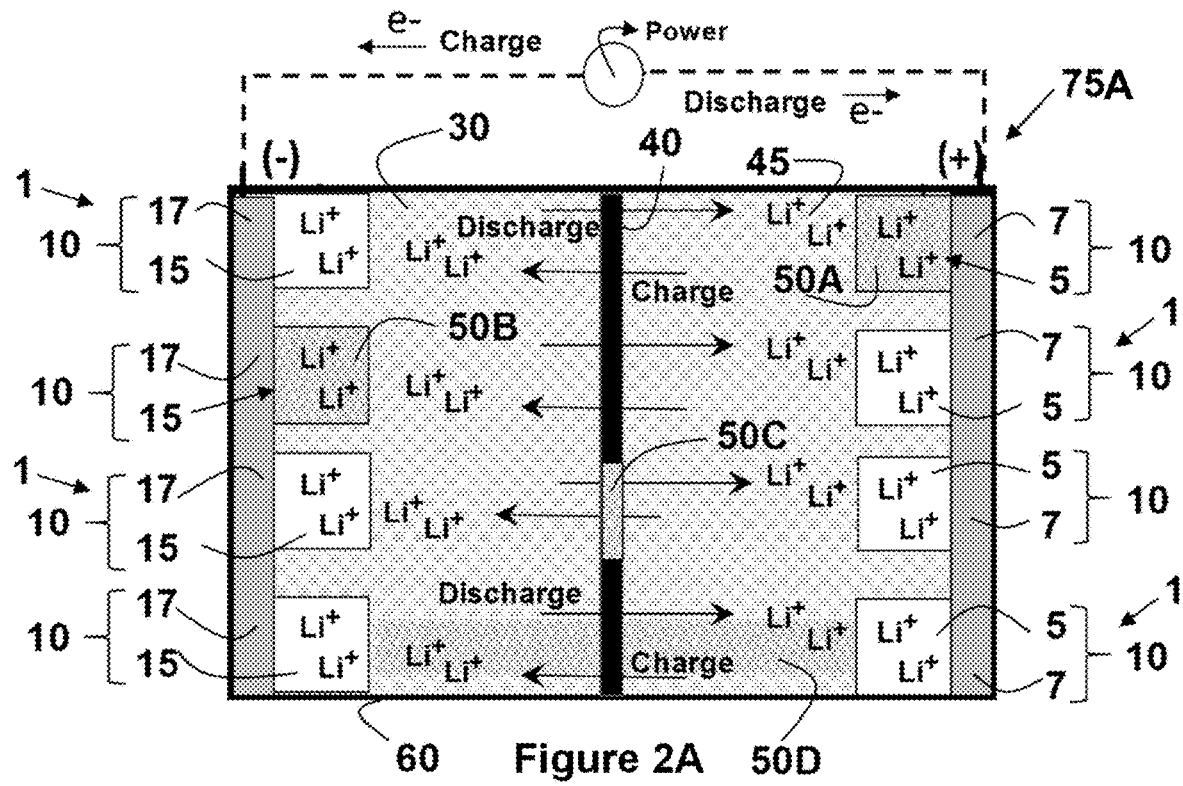
FIG. 2A is a schematic representation of a lithium-ion secondary battery formed according to the teachings of the present disclosure showing the layering of the secondary cells of FIGS. 1A-1D to form a larger mixed cell.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the zeolites made and used according to the teachings contained herein is described throughout the present disclosure in conjunction with a secondary cell for use in a lithium-ion secondary battery in order to more fully illustrate the structural elements and the use thereof. The incorporation and use of such inorganic materials as additives in other applications, including without limitation in other electrochemical cells, such as for example a primary cell used in a lithium-ion battery, is contemplated to be within the scope of the present disclosure. It should be understood that throughout the description and drawings, corresponding reference numerals indicate like or corresponding parts and features.

For the purpose of this disclosure, the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

The present disclosure generally provides an inorganic material that comprises, consists essentially of, or consists of one or more types of a zeolite having a silicon (Si) to aluminum (Al) ratio ranging from about 2 to about 50 that can absorb malicious species, such as moisture ($H_2O$), free transition-metal ions ($TM^{n+}$), and/or hydrogen fluoride (HF) that may become present or formed within the housing of a lithium-ion secondary battery. The removal of these malicious species prolongs the battery's calendar and cycle lifetime when the inorganic material is applied to, at least one of, the electrolyte, separator, positive electrode, and negative electrode. The inorganic material may also be applied to the inner wall of the housing of the lithium-ion secondary battery.

In order to deal with the problems as discussed above, the inorganic material acts as a trapping agent or scavenger for the malicious species present within the housing of the battery. The inorganic material accomplishes this objective by effectively absorbing moisture, free transition-metal ions, and/or hydrogen fluoride (HF) selectively, while having no effect on the performance of the non-aqueous electrolyte, including the lithium-ions and organic transport medium contained therein. The multifunctional inorganic particles may be introduced into the lithium-ion secondary battery or each cell therein as at least one of an additive to the positive electrode, an additive to negative electrode, and additive to the non-aqueous electrolyte, and as a coating material applied to the separator.

Referring to FIGS. 1A to 1D, a secondary lithium-ion cell 1 generally comprises a positive electrode 10, a negative electrode 20, a non-aqueous electrolyte 30, and a separator 40. The positive electrode 10 comprises an active material that acts as a cathode 5 for the cell 1 and a current collector 7 that is in contact with the cathode 5, such that lithium ions 45 flow from the cathode 5 to the anode 15 when the cell 1 is charging. Similarly, the negative electrode 20 comprises an active material that acts as an anode 15 for the cell 1 and a current collector 17 that is in contact with the anode 15, such that lithium ions 45 flow from the anode 15 to the cathode 5 when the cell 1 is discharging. The contact between the cathode 5 and the current collector 7, as well as the contact between the anode 15 and the current collector 17, may be independently selected to be direct or indirect contact; alternatively, the contact between the anode 15 or cathode 5 and the corresponding current collector 17, 7 is directly made.

The non-aqueous electrolyte 30 is positioned between and in contact with, i.e., in fluid communication with, both the negative electrode 20 and the positive electrode 10. This non-aqueous electrolyte 30 supports the reversible flow of lithium ions 45 between the positive electrode 10 and the negative electrode 20. The separator 40 is placed between the positive electrode 10 and negative electrode 20, such that the separator 40 separates the anode 15 and a portion of the electrolyte 30 from the cathode 5 and the remaining portion of the electrolyte 30. The separator 40 is permeable to the reversible flow of lithium ions 45 there through.

Still referring to FIGS. 1A to 1D, at least one of the cathode 5, the anode 15, the electrolyte 30, and the separator 40 includes an inorganic additive 50A-50D that absorbs one or more of moisture, free transition metal ions, or hydrogen fluoride (HF), as well as other malicious species that become present in the cell. Alternatively, the inorganic additive 50A-50D selectively absorbs moisture, free transition metal ions, and/or hydrogen fluoride (HF). This inorganic additive 50A-50D may be selected to be one or more types of a zeolite having a silicon (Si) to aluminum (Al) ratio ranging from about 2 and 50; alternatively, between about 2 and 25; alternatively, ranging from about 2 to about 20; alternatively, ranging from about 5 to about 15.

According to one aspect of the present disclosure, the inorganic additive 50A-50D may be dispersed within at least a portion of the positive electrode 50A (see FIG. 1A), the negative electrode 50B (see FIG. 1B), the separator 50C (see FIG. 1C), or the electrolyte 50D (see FIG. 1D). The inorganic additive 50A-50D may also be in the form of a coating applied onto a portion of a surface of the negative electrode 50B, the positive electrode 50A, or the separator 50C.

The inorganic additive of the present disclosure comprises at least one or a combination selected from different types of zeolites having a CHA, CHI, FAU, LTA or LAU framework. The amount of the inorganic additive present in the secondary cell may be up to 10 wt. %; alternatively, up to 5 wt. %; alternatively, between 0.1 wt. % and 5 wt. %, relative to the overall weight of each component in which the inorganic additive is present, namely, the positive electrode, the negative the electrode, or the electrolyte. The amount of the inorganic additive applied as a coating to the separator of the secondary cell may be up to 100%; alternatively, at least 90%; alternatively, greater than 5% up to 100%.

Zeolites are crystalline or quasi-crystalline aluminosilicates comprised of repeating $TO_4$ tetrahedral units with T being most commonly silicon (Si) or aluminum (Al). These repeating units are linked together to form a crystalline framework or structure that includes cavities and/or channels of molecular dimensions within the crystalline structure. Thus, aluminosilicate zeolites comprise at least oxygen (O), aluminum (Al), and silicon (Si) as atoms incorporated in the framework structure thereof. Since zeolites exhibit a crystalline framework of silica ($SiO_2$) and alumina ($Al_2O_3$) interconnected via the sharing of oxygen atoms, they may be characterized by the ratio of $SiO_2$:$Al_2O_3$ (SAR) present in the crystalline framework.

The inorganic additive of the disclosure exhibits a framework topology of a chabazite (framework notation="CHA"), chiavennite (CHI), faujasite (FAU), linde type A (LTA), and laumontite (LAU). The framework notation represents a code specified by the International Zeolite Associate (IZA) that defines the framework structure of the zeolite. Thus, for example, a chabazite means a zeolite in which the primary crystalline phase of the zeolite is "CHA".

The crystalline phase or framework structure of a zeolite may be characterized by X-ray diffraction (XRD) data. However, the XRD measurement may be influenced by a variety of factors, such as the growth direction of the zeolite; the ratio of constituent elements; the presence of an adsorbed substance, defect, or the like; and deviation in the intensity ratio or positioning of each peak in the XRD spectrum. Therefore, a deviation of 10% or less; alternatively, 5% or less; alternatively, 1% or less in the numerical value measured for each parameter of the framework structure for each zeolite as described in the definition provided by the IZA is within expected tolerance.

According to one aspect of the present disclosure, the zeolites of the present disclosure may include natural zeolites, synthetic zeolites, or a mixture thereof. Alternatively, the zeolites are synthetic zeolites because such zeolites exhibit greater uniformity with respect to SAR, crystallite size, and crystallite morphology, as well has fewer and less concentrated impurities (e.g. alkaline earth metals).

The inorganic additive 50A-50D may comprise a plurality of particles having or exhibiting a morphology that is plate-like, cubic, spherical, or a combination thereof. Alternatively, the morphology is predominately, spherical in nature. These particles may exhibit an average particle size ($D_{50}$) that is in the range of about 0.01 micrometers (μm) to about 15 micrometers (μm); alternatively about 0.05 micrometers (μm) to about 10 micrometers (μm); alternatively, 0.5 micrometers (μm) to about 7.5 micrometers (μm); alternatively, 1 micrometer (μm) to about 5 micrometers (μm); alternatively, greater than or equal to 0.5 μm; alternatively, greater than or equal to 1 μm; alternatively, less than 5 μm. Scanning electron microscopy (SEM) or other optical or digital imaging methodology known in the art may be used to determine the shape and/or morphology of the inorganic additive. The average particle size and particle size distributions may be measured using any conventional technique, such as sieving, microscopy, Coulter counting, dynamic light scattering, or particle imaging analysis, to name a few. Alternatively, a laser particle analyzer is used for the determination of average particle size and its corresponding particle size distribution.

The inorganic additive 50A-50D may also exhibit surface area that is in the range of about 2 $m^2$/g to about 5000 $m^2$/g; alternatively from about 5 $m^2$/g to about 2500 $m^2$/g; alternatively, from about 10 $m^2$/g to about 1000 $m^2$/g; alternatively, about 25 $m^2$/g to about 750 $m^2$/g. The pore volume of the inorganic additive 50A-50D may be in the range of about 0.05 cc/g to about 3.0 cc/g; alternatively, 0.1 cc/g to about 2.0 cc/g. The measurement of surface area and pore volume for the inorganic additive may be accomplished using any known technique, including without limitation, microscopy, small angle x-ray scattering, mercury porosimetry, and Brunauer, Emmett, and Teller (BET) analysis. Alternatively, the surface area and pore volume are determined using Brunauer, Emmett, and Teller (BET) analysis.

The inorganic additive 50A-50D may include a sodium (Na) concentration of about 0.01 wt. % to about 2.0 wt. % based on the overall weight of the inorganic additive. Alternatively, the Na concentration may range from about 0.1 wt. % to about 1.0 wt. %. The inorganic additive may be a lithium-ion exchanged zeolite, such that the concentration of lithium ion is about 0.05 wt. % to about 25 wt. %; alternatively, about 0.1 wt. % to about 20 wt. %; alternatively, about 0.2 wt. % to about 15 wt. %, based on the overall weight of the inorganic additive. When desirable, the inorganic additive may further include one or more doping elements selecting from Li, Na, Al, Mn, Sm, Y, Cr, Eu, Er, Ga, Zr, and Ti.

The active materials in the positive electrode 10 and the negative electrode 20 may be any material known to perform this function in a lithium-ion secondary battery. The active material used in the positive electrode 10 may include, but not be limited to lithium transition metal oxides or transition metal phosphates. Several examples of active materials that may be used in the positive electrode 10 include, without limitation, $LiCoO_2$, $LiNi_{1-x-y}Co_xMn_yO_2$ (x+y≤⅔), $zLi_2MnO_3·(1-z)LiNi_{01-x-y}Co_xMn_yO_2$ (x+y≤⅔), $LiMn_2O_4$, $LiNi_{0.5}Mn_{1.5}O_4$, and $LiFePO_4$. The active materials used in the negative electrode 15 may include, but not be limited to graphite and $Li_4Ti_5O_{12}$, as well as silicon and lithium metal. Alternatively, the active material for use in the negative electrode is silicon or lithium metal due to their one-magnitude higher specific capacities. The current collectors 7, 17 in both the positive 10 and negative 20 electrodes may be made of any metal known in the art for use in an electrode of a lithium battery, such as for example, aluminum for the cathode and copper for the anode. The cathode 5 and anode 15 in the positive 10 and negative 20 electrodes are generally made up of two dissimilar active materials.

The non-aqueous electrolyte 30 is used to support the oxidation/reduction process and provide a medium for lithium ions to flow between the anode 15 and cathode 5. The non-aqueous electrolyte 30 may be a solution of a lithium salt in an organic solvent. Several examples of lithium salts, include, without limitation, lithium hexafluorophosphate ($LiPF_6$), lithium bis(oxalato)-borate (LiBOB), and lithium bis(trifluoro methane sulfonyl)imide (LiTFSi). These lithium salts may form a solution with an organic solvent, such as, for example, ethylene carbonate (EC), ethyl methyl carbonate (EMC), diethyl carbonate (DEC), dimethyl carbonate (DMC), propylene carbonate (PC), vinylene carbonate (VC), and fluoroethylene carbonate (FEC), to name a few. A specific example of an electrolyte is a 1 molar solution of $LiPF_6$ in a mixture of ethylene carbonate and diethyl carbonate (EC/DEC=50/50 vol.).

The separator 40 ensures that the anode 15 and cathode 5 do not touch and allows lithium ions to flow there through. The separator 40 may be a polymeric membrane comprising, without limitation, polyolefin based materials with semi-crystalline structure, such as polyethylene, polypropylene, and blends thereof, as well as micro-porous poly (methyl methacrylate)-grafted, siloxane grafted polyethylene, and polyvinylidene fluoride (PVDF) nanofiber webs.

Figure 2B:
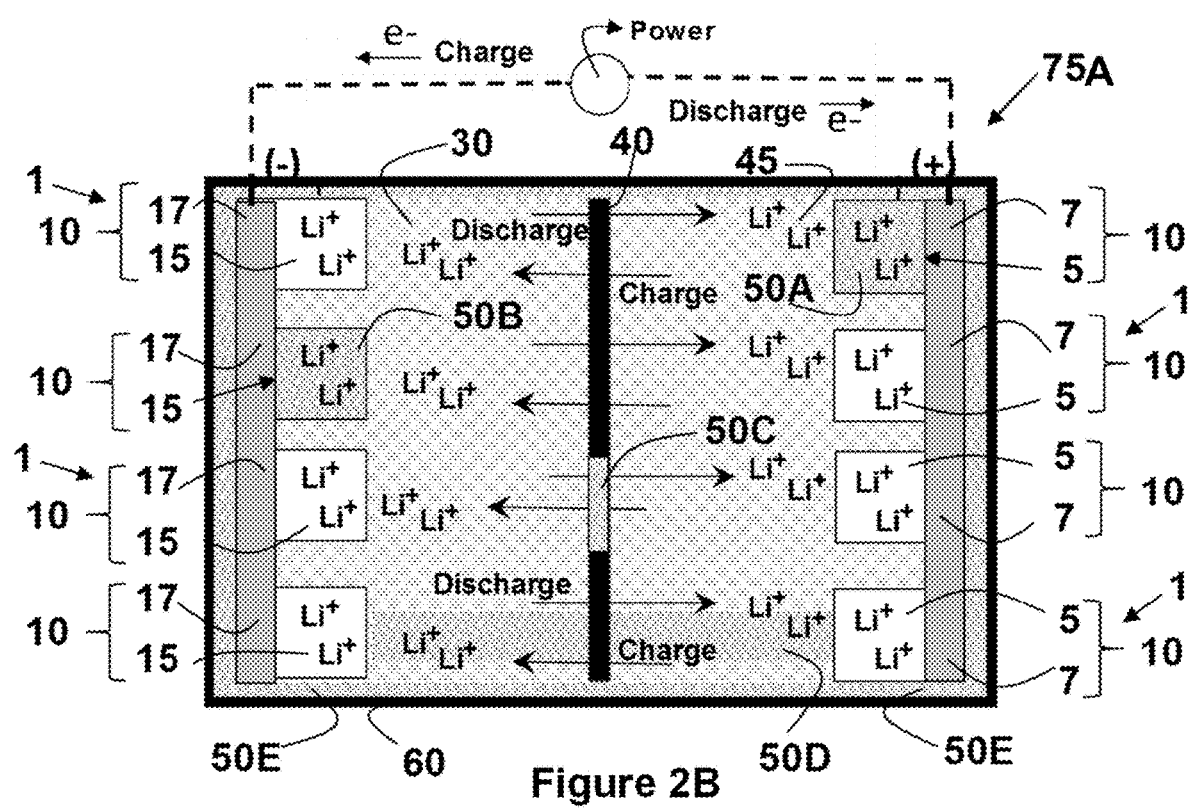
FIG. 2B is a schematic representation of the lithium-ion secondary battery of FIG. 2A in which an inorganic additive further forms a coating on the internal wall of the housing.
Figure 3A:
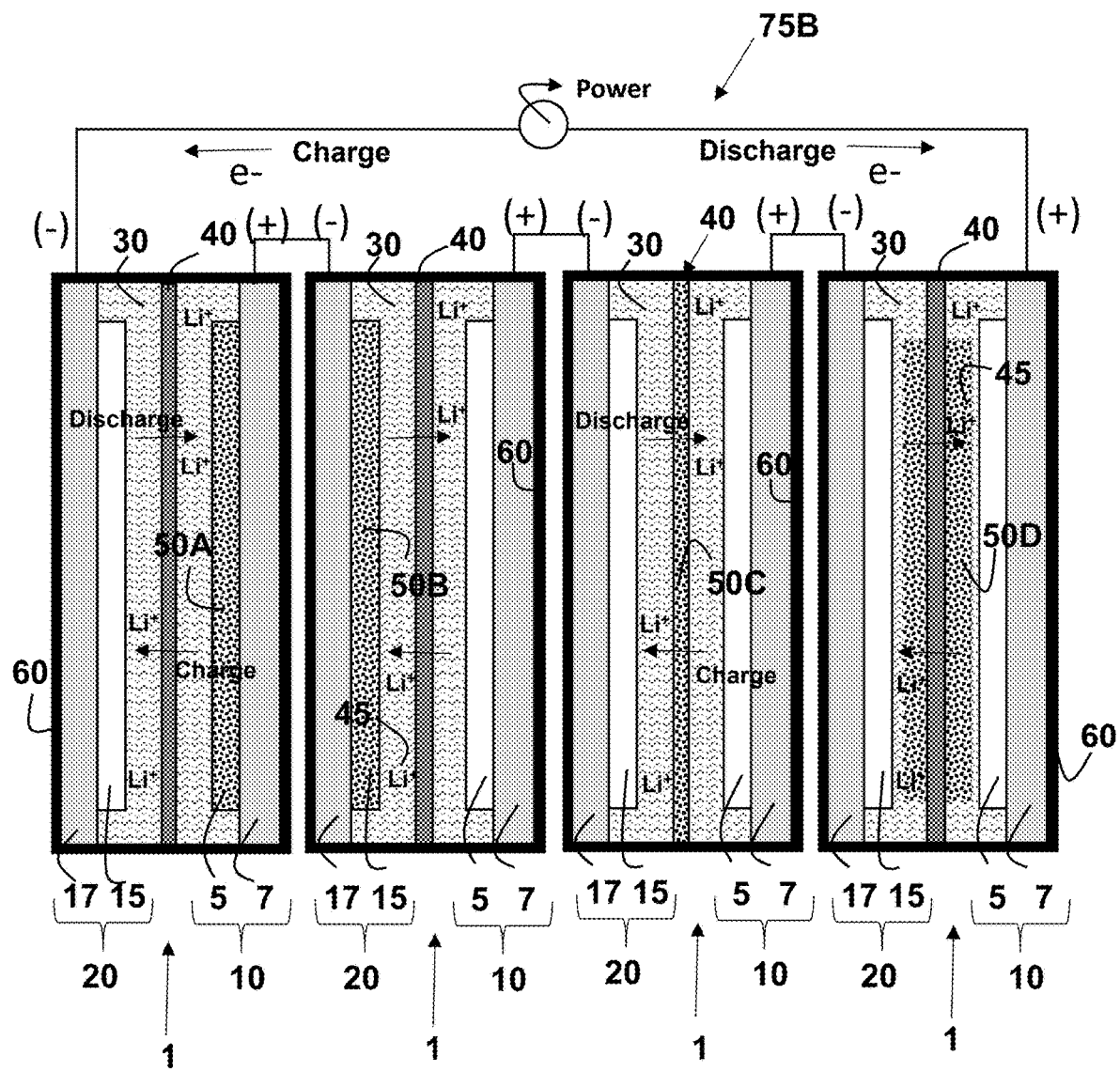
FIG. 3A is a schematic representation of a lithium-ion secondary battery formed according to the teachings of the present disclosure showing the incorporation of the secondary cells of FIGS. 1A-1D in series.
Figure 3B:
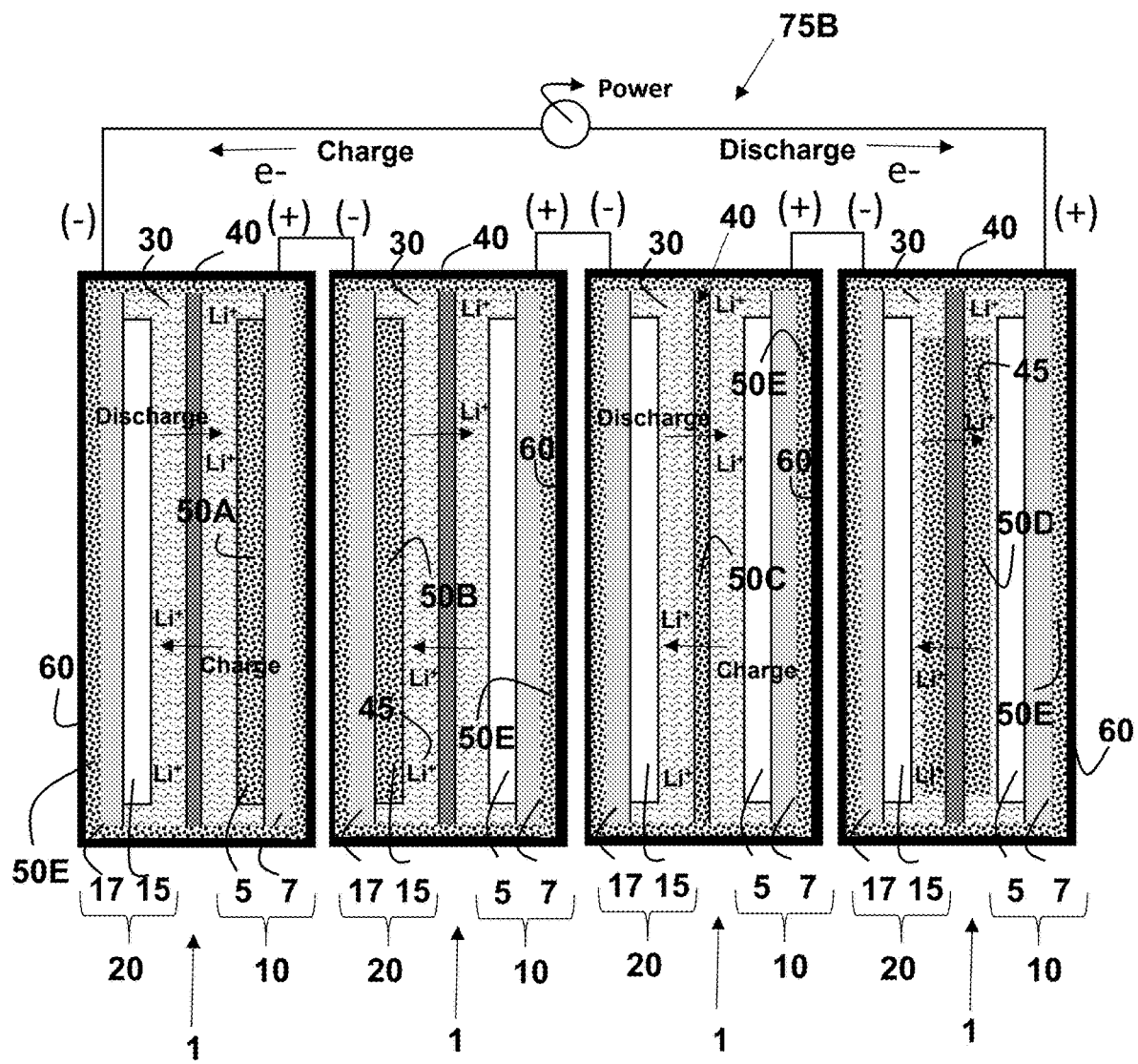
FIG. 3B is a schematic representation of the lithium-ion secondary battery of FIG. 3A in which an inorganic additive further forms a coating on the internal wall of the housing.

According to another aspect of the present disclosure, one or more secondary cells may be combined to form a lithium-ion secondary battery. In FIGS. 2A and 2B, an example of such a battery 75A is shown in which the four (4) secondary cells of FIGS. 1A-1D are layered to form a larger single secondary cell that is encapsulated to produce the battery 75. In FIGS. 3A and 3B, another example of a battery 75B is shown, in which the four (4) secondary cells of FIGS. 1A-1D are stacked or placed in series to form a larger capacity battery 75B with each cell being individually contained. The lithium-ion secondary battery 75A, 75B also includes a housing 60 having an internal wall in which the secondary cells 1 are enclosed or encapsulated in order to provide for both physical and environmental protection. One skilled in the art will understand that although the battery 75A, 75B shown in FIGS. 2A/2B and 3A/3B incorporate the four secondary cells of FIGS. 1A-1D that a battery 75A, 75B may include any other number of cells. In addition, the battery 75A, 75B may include one or more cells in which the inorganic additive is incorporated with the positive electrode (50A, FIG. 1A), the negative electrode (50B, FIG. 1B), the separator (50C, FIG. 1C), or the electrolyte (50D, FIG. 1D). In fact, all of the cells may have the inorganic additive incorporated in the same way, e.g., 50A, 50B, 50C, or 50D. When desirable, the battery 75A, 75B may also include one or more cells in which the inorganic additive 50A-50D is not incorporated or included provided that at least one of the cells in the battery 75A, 75B incorporates the inorganic additive 50A-50D.

The housing 60 may be constructed of any material known for such use in the art. Lithium-ion batteries generally are housed in three different main form factors or geometries, namely, cylindrical, prismatic, or soft pouch. The housing 60 for a cylindrical battery may be made of aluminum, steel, or the like. Prismatic batteries generally comprise a housing 60 that is rectangular shaped rather than cylindrical. Soft pouch housings 60 may be made in a variety of shapes and sizes. These soft housings may be comprised of an aluminum foil pouch coated with a plastic on the inside, outside, or both. The soft housing 60 may also be a polymeric-type encasing. The polymer composition used for the housing 60 may be any known polymeric materials that are conventionally used in lithium-ion secondary batteries. One specific example, among many, include the use of a laminate pouch that comprises a polyolefin layer on the inside and a polyamide layer on the outside. A soft housing 60 needs to be designed such that the housing 60 provides mechanical protection for the secondary cells 1 in the battery 75.

Referring now to only FIGS. 2B and 3B, the inorganic additive 50E may also be included as a coating applied onto at least a portion of a surface of the internal wall of the housing 60. When desirable, the inorganic additive 50E applied to the internal wall of the housing 60 may be used along with the inclusion of the inorganic additive 50A-50D in one or more of the secondary cells 1 or used separately with secondary cells that do not individually include the inorganic additive 50A-50D.

A variety of factors can cause degradation in lithium-ion secondary batteries. One of these factors is the existence of various malicious species in the non-aqueous electrolyte. These malicious species include moisture (e.g., water or water vapor), hydrogen fluoride (HF), and dissolved transition-metal ions ($TM^{n+}$).

Moisture in the electrolyte mainly arises as a fabrication residue and from the decomposition of the organic electrolyte. Although a dry environment is desired, the presence of moisture cannot be thoroughly excluded during the production of a battery or battery cell. The organic solvent in the electrolyte is inclined to decompose to yield $CO_2$ and $H_2O$, especially when operated at a high temperature. The water ($H_2O$) can react with a lithium salt, such as $LiPF_6$, resulting in the generation of lithium fluoride (LiF) and hydrogen fluoride (HF). The lithium fluoride (LiF), which is insoluble, can deposit on the surfaces of the active materials of the anode or cathode forming a solid electrolyte interface (SEI). This solid electrolyte interface (SEI) may reduce or retard the lithium-ions (de)intercalation and inactivate the surface of the active material, thereby, leading to a poor rate capability and/or capacity loss.

Hydrogen fluoride (HF), when present, may attack the positive electrode, which contains transition metal and oxygen ions, resulting in the formation of more water and transition metal compounds that are compositionally different from the active material. When water is present and acts as a reactant, the reactions that occur may become cyclic, resulting in continual damage to the electrolyte and the active material. In addition, the transition metal compounds that are formed may be insoluble and electrochemically inactive. These transition metal compounds may reside on the surface of the positive electrode, thereby, forming an SEI. On the other hand, any soluble transition metal compounds may dissolve into the electrolyte resulting in transition metal ions ($TM^{n+}$). These free transition metal ions, such as, for example, $Mn^{2+}$ and $Ni^{2+}$, can move towards the anode where they may be deposited as an SEI leading to the introduction of a variety of different reactions. These reactions, which may consume the active materials of the electrodes and the lithium-ions present in the electrolyte, can also lead to capacity loss in the lithium-ion secondary battery.

The specific examples provided in this disclosure are given to illustrate various embodiments of the invention and should not be construed to limit the scope of the disclosure. The embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Evaluation Method 1—Transition-Metal Cations Trapping Capability of the Inorganic Additive The performance of the inorganic additive with respect to adsorption capabilities for $Mn^{2+}$, $Ni^{2+}$, and $Co^{2+}$, are measured in an organic solvent, namely a mixture of ethylene carbonate and dimethyl carbonate (EC/DMC=50/50 vol.)

The $Mn^{2+}$, $Ni^{2+}$, and $Co^{2+}$ trapping capabilities of the inorganic additives in the organic solvent are analyzed by ICP-OES. The organic solvent is prepared, such that it contains 1000 ppm manganese (II), nickel (II), and cobalt (II) perchlorate, respectively. The inorganic additive in particle form is added as 1 wt. % of the total mass, with the mixture being stirred for 1 minute, then allowed to stand still at 25° C. for 24 hours prior to measuring the decrease of the concentration of $Mn^{2+}$, $Ni^{2+}$, and $Co^{2+}$.

Evaluation Method 2—HF Scavenging Capability of the Inorganic Additive

The HF scavenging capability of the inorganic additives in the non-aqueous electrolyte, namely 1 M $LiPF_6$ in a mixture of ethylene carbonate and dimethyl carbonate (EC/

DMC=50/50 vol.), is analyzed by a Fluoride ISE meter. The electrolyte solution is prepared, such that it contains 100 ppm HF. The inorganic additive in particle form is added as 1 wt. % of the total mass, with the mixture being stirred for 1 minute, then allowed to stand still at 25° C. for 24 hours prior to measuring the decrease of F-in the solution.

Below are the reactions in a Li-ion battery with moisture residue.

$LiPF_6+H_2O \rightarrow HF+LiF\downarrow +H_3PO_4$ and

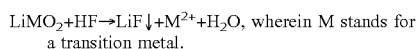

$LiMO_2+HF \rightarrow LiF\downarrow +M^{2+}+H_2O$, wherein M stands for a transition metal.

As a result, in order to reduce HF in the electrolyte, the inorganic additive consumes the HF and moisture residue at the same time, thereby, breaking the reaction chain.

Evaluation Method 3—Separator

The separators are fabricated using a monolayer polypropylene membrane (Celgard 2500, Celgard LLC, North Carolina). Separators with and without the inclusion of the inorganic additive are constructed for performance comparison. A slurry containing the inorganic additive is coated onto the separator in two-side form. The slurry is made of 10-50 wt. % inorganic additive particles dispersed in deionized (D.I.) water. The mass ratio of a polymeric binder to the total solids is 1-10%. The coating is 5-15 μm in thickness before drying. The thickness of the coated separator is 25-45 μm. The coated separators are punched into a round disks in a diameter of 19 mm.

Evaluation Method 4—Coin-Cell Cycling

Coin cells (2025-type) are made for evaluating the inorganic additives in a electrochemical situation. A coin cell is made with exterior casing, spacer, spring, current collector, positive electrode, separator, negative electrode, and non-aqueous electrolyte.

To fabricate films for use with the positive electrode, a slurry is made by dispersing the active material (AM), such as $LiNi_{1/3}Co_{1/3}Mn_{1/3}O_2$ and carbon black (CB) powders in an n-methyl-2-pyrrolidone (NMP) solution of polyvinylidene fluoride (PVDF). The mass ratio of AM:CB:PVDF slurry is 90:5:5. In each case, the slurry is blade coated onto aluminum films. After drying and calendaring, the thickness of each positive electrode film formed is measured to be in the range of 50-150 μm. The positive electrode films are punched into round disks in a diameter of 12 mm respectively. The mass loading of active material is in the range of 5-15 mg/cm².

Lithium metal foil (0.75 mm in thickness) is cut into a round disk in a diameter of 12 mm as the negative electrode.

2025-type coin cells are made along with the abovementioned positive and negative electrodes, separator as described in Evaluation Method 3, and 1 M $LiPF_6$ in a mixture of ethylene carbonate and dimethyl carbonate (EC/DMC=50/50 vol.) as the electrolyte as further described herein for battery performance testing. The cells are cycled between 3 and 4.3 V at the current loadings of C/2 at 25° C. after two C/5 formation cycles.

EXAMPLE 1

A FAU-type Y zeolite is used as the inorganic additive, which has been ion-exchanged with Li. The particle size is measured as 0.27, 0.43, 3.76 μm for $D_{10}$, $D_{50}$, and $D_{90}$, respectively. The surface area is 640 m²/g with the pore volume of 0.23 cc/g. The SAR is 3.6, and the inorganic additive contains 0.35 wt. % of $Na_2O$ and 6.36 wt. % of $Li_2O$.

In the trapping capability test for transition-metal cations, the inorganic additive reduced the $Ni^{2+}$, $Mn^{2+}$, and $Co^{2+}$ in EC/DMC by 63%, 77%, and 84%, respectively. In addition, the inorganic additive scavenges 30% HF in the electrolyte solution.

Figure 4:
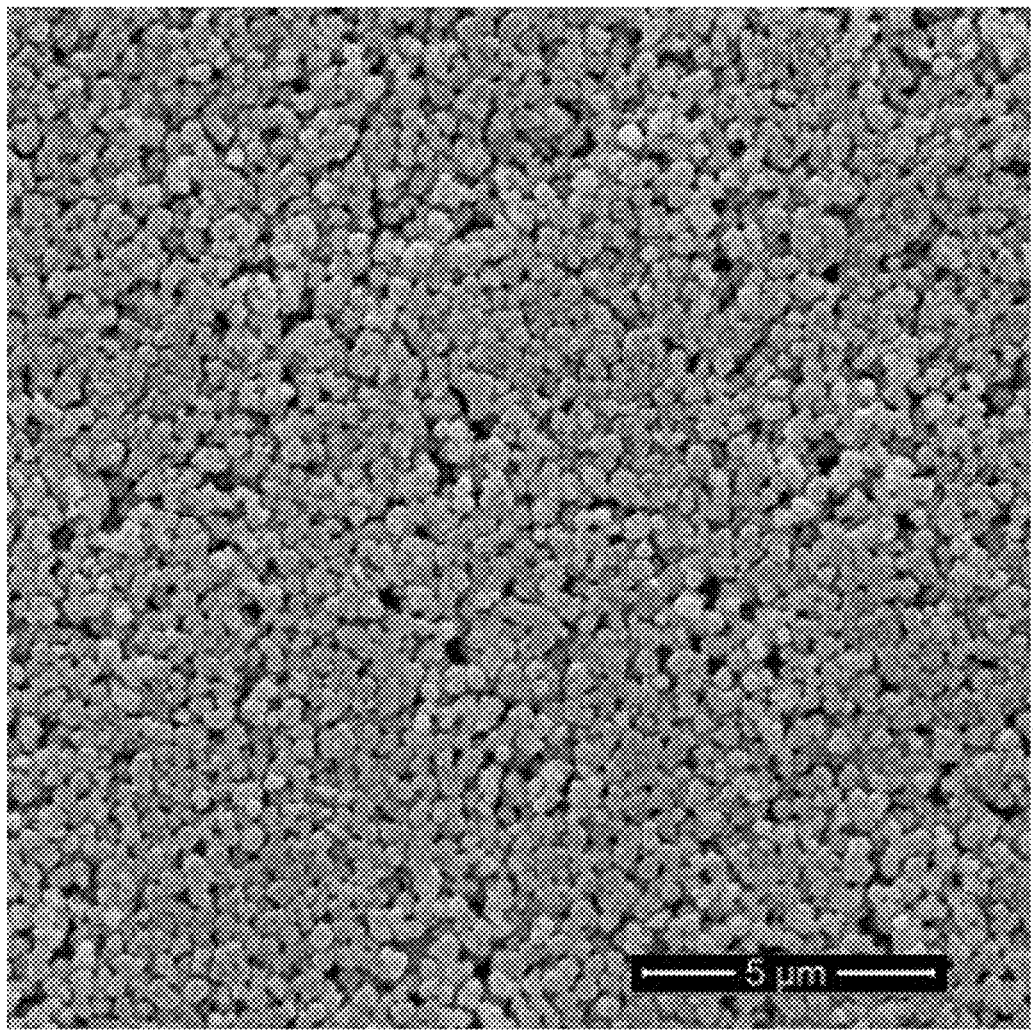
FIG. 4 is a scanning electron micrograph (SEM) of the surface of a coated separator prepared according to present disclosure.

In order to coat the Y zeolite on to onto Celgard 2500 separator, a slurry is made with Y zeolite powder and PVA solution. The weight ratio of inorganic powder to polymer binder is 12.5:1. The solid loading of the slurry is 20%. The slurry is coated in two-side form. The thickness is 7.5 μm for one coating layer. The SEM image of the coated separator is shown in FIG. 4.

Figure 5:
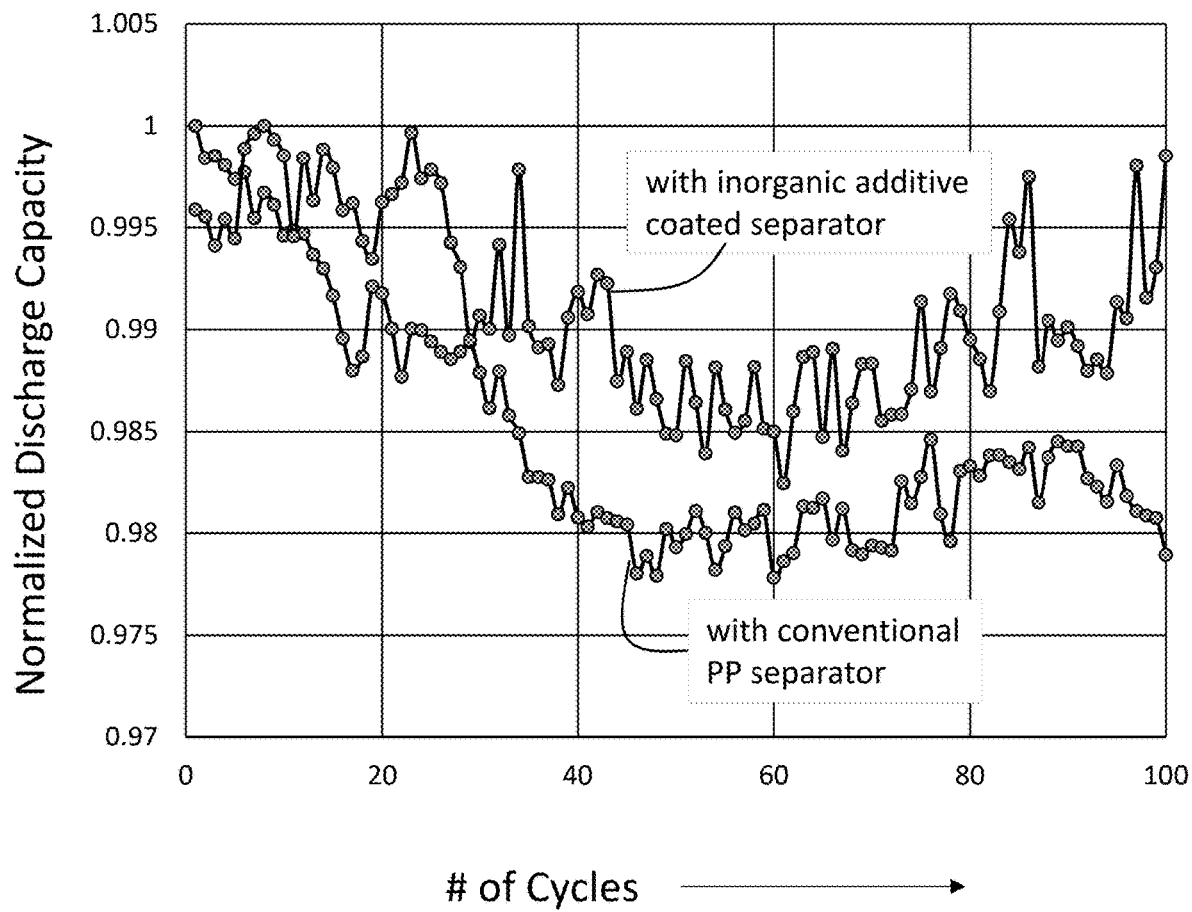
FIG. 5 is a graphical representation of the normalized discharge capacity measured as a function of cycles for a cell having a conventional separator and a cell having a coated separator prepared according to the present disclosure.
Figure 6:
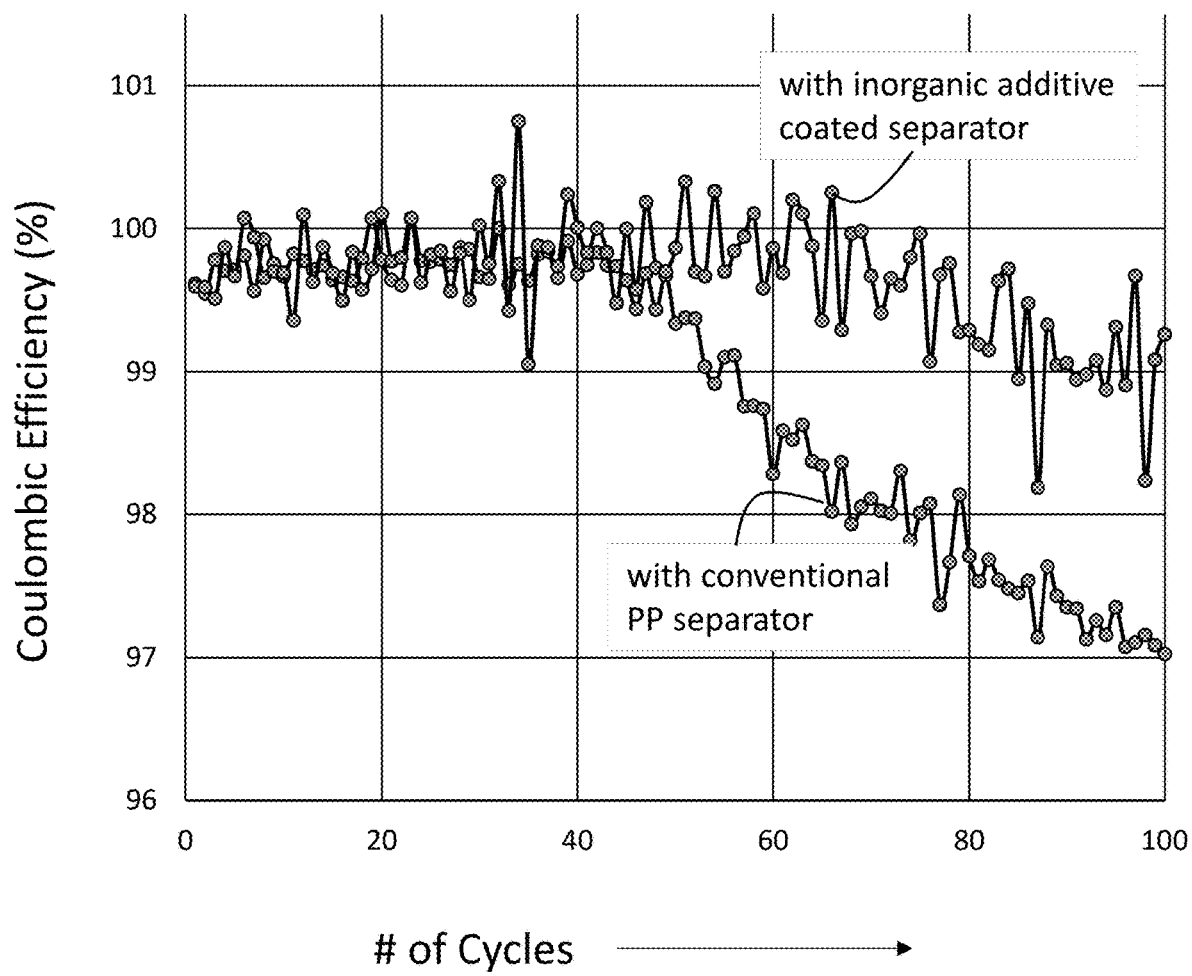
FIG. 6 is a graphical representation of the coulombic efficiency measured as a function of cycles for a cell having a conventional separator and a cell having a coated separator prepared according to the present disclosure.

In the first formation cycle, the cell with the conventional bare polypropylene separator shows a discharge capacity of 149.6 mAh/g with 86.1% as coulombic efficiency. In contrast, the cell with the coated separator of the present disclosure exhibits 145.8 mAh/g and 81.2% for the discharge capacity and coulombic efficiency, respectively. Coulombic efficiency of each cell reaches above 99.5% after formation cycles. After 100 cycles of C/2 charge-and-discharge at 25° C., the cell with the coated separator has around 0.5% capacity loss, while the cell with the conventional uncoated separator shows approximately 2% degradation. The coulombic efficiency of the cell with the coated separator degrades about 1%, while the degradation observed for the cell with the conventional bare polypropylene separator is 3%. This degradation of discharge capacity and coulombic efficiency is shown in more detail in FIGS. 5 and 6, respectively, as a function of cycles. In FIG. 5, the discharge capacity is shown as a normalized value.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A cell for use in a lithium-ion secondary battery, the cell comprising:

a positive electrode, the positive electrode comprising an active material as a cathode for the cell and a current collector that is in contact with the cathode; wherein lithium ions flow from the cathode to an anode when the cell is charging;

a negative electrode, the negative electrode comprising an active material as the anode for the cell and a current collector that is in contact with the anode; wherein lithium ions flow from the anode to the cathode when the cell is discharging;

a non-aqueous electrolyte positioned between and in contact with both the negative electrode and the positive electrode; wherein the non-aqueous electrolyte supports the reversible flow of lithium ions between the positive electrode and the negative electrode; and a separator placed between the positive electrode and negative electrode, such that the separator separates the anode and a portion of the non-aqueous electrolyte from the cathode and the remaining portion of the non-aqueous electrolyte; wherein the separator is permeable to the reversible flow of lithium ions there through;

wherein at least one of the non-aqueous electrolyte and the separator includes an inorganic additive that absorbs moisture, free transition metal ions, and hydrogen fluoride (HF) that become present in the cell; the inorganic additive being one or more types of a zeolite having a zeolite framework of CHA, CHI, FAU, LTA or LAU with a silicon (Si) to aluminum (Al) ratio ranging from about 2 to about 50; the inorganic additive having a surface area that is in the range of about 10 $m^2/g$ to about 1000 $m^2/g$, a pore volume in the range of 0.1-2.00 cc/g, as well as a sodium concentration that ranges from 0.1 wt. % to about 1.0 wt. % and a lithium concentration that ranges from 2.5 wt. % to 10 wt. % based on the overall weight of the inorganic additive;

wherein the cell has a loss in discharge capacity after 100 cycles of C/2 charge-and-discharge at 25° C. of about 0.5%.

2. The cell according to claim 1, wherein the inorganic additive is dispersed within at least a portion of at least one of the positive electrode, the negative electrode, the non-aqueous electrolyte, and the separator or is in the form of a coating applied onto a portion of a surface of the negative electrode, the positive electrode, or the separator.

3. The cell according to claim 1, wherein the inorganic additive comprises particles having a morphology that is plate-like, cubic, spherical, or a combination thereof.

4. The cell according to claim 1, wherein the inorganic additive comprises particles having a particle size ($D_{50}$) that is in the range of about 0.05 micrometers (μm) to about 5 micrometers (μm).

5. The cell according to claim 1, wherein the inorganic additive includes one or more doping elements selecting from K, Mg, Cu, Ni, Zn, Fe, Ce, Sm, Y, Cr, Eu, Er, Ga, Zr, and Ti.

6. The cell according to claim 1, wherein the positive electrode comprises a lithium transition metal oxide or a lithium transition metal phosphate;

the negative electrode comprises graphite, a lithium titanium oxide, silicon metal, or lithium metal;
the separator is a polymeric membrane; and
the non-aqueous electrolyte is a solution of a lithium salt dispersed in an organic solvent.

7. A lithium-ion secondary battery comprising:
one or more secondary cells; and
one or more housings, such that an internal wall from one of the one or more housings encapsulates at least one or more of the secondary cells;

wherein each of the one or more secondary cells comprises:

a positive electrode, the positive electrode comprising an active material as a cathode for the cell and a current collector that is in contact with the cathode; wherein lithium ions flow from the cathode to an anode when the cell is charging;

a negative electrode, the negative electrode comprising an active material as the anode for the cell and a current collector that is in contact with the anode; wherein lithium ions flow from the anode to the cathode when the cell is discharging;

a non-aqueous electrolyte positioned between and in contact with both the negative electrode and the positive electrode; wherein the non-aqueous electrolyte supports the reversible flow of lithium ions between the positive electrode and the negative electrode; and a separator placed between the positive electrode and negative electrode, such that the separator separates the anode and a portion of the non-aqueous electrolyte from the cathode and the remaining portion of the non-aqueous electrolyte; wherein the separator is permeable to the reversible flow of lithium ions there through;

wherein at least one of the non-aqueous electrolyte, the separator, and the internal wall of the housing includes an inorganic additive that absorbs moisture, free transition metal ions, and hydrogen fluoride (HF) that become present in the cell; the inorganic additive being one or more types of a zeolite having a zeolite framework of CHA, CHI, FAU, LTA or LAU with a silicon (Si) to aluminum (Al) ratio ranging from about 2 to about 50; the inorganic additive having a surface area that is in the range of about 10 $m^2/g$ to about 1000 $m^2/g$, a pore volume in the range of 0.1-2.00 cc/g, as well as a sodium concentration that ranges from 0.1 wt. % to about 1.0 wt. % and a lithium concentration that ranges from 2.5 wt. % to 10 wt. % based on the overall weight of the inorganic additive;

wherein the one or more secondary cells has a loss in discharge capacity after 100 cycles of C/2 charge-and-discharge at 25° C. of about 0.5%.

8. The battery according to claim 7, wherein the inorganic additive is dispersed within least a portion of at least one of the positive electrode, the negative electrode, the non-aqueous electrolyte, and the separator or is in the form of a coating applied onto a portion of a surface of the negative electrode, the positive electrode, the separator; or the internal wall of the housing.

9. The battery according to claim 7, wherein the inorganic additive comprises particles having a morphology that is plate-like, cubic, spherical, or a combination thereof.

10. The battery according to claim 7, wherein the inorganic additive comprises particles having a particle size ($D_{50}$) that is in the range of about 0.05 micrometers (μm) to about 5 micrometers (μm).

11. The battery according to claim 7, wherein the inorganic additive includes one or more doping elements selecting from K, Mg, Cu, Ni, Zn, Fe, Ce, Sm, Y, Cr, Eu, Er, Ga, Zr, and Ti.

12. The battery according to claim 7, wherein the positive electrode comprises a lithium transition metal oxide or a lithium transition metal phosphate;
- the negative electrode comprises graphite, a lithium titanium oxide, silicon metal, or lithium metal;
- the separator is a polymeric membrane; and
- the non-aqueous electrolyte is a solution of a lithium salt dispersed in an organic solution.

\* \* \* \* \*